United States Patent [19]
Kuriki et al.

[11] Patent Number: 5,532,736
[45] Date of Patent: Jul. 2, 1996

[54] DISPLAY AND IMAGE CAPTURE APPARATUS

[75] Inventors: Makoto Kuriki, Tokyo; Kazutake Uehira, Tokorozawa; Yukio Takahashi, Tokyo; Shigenobu Sakai, Tama, all of Japan

[73] Assignee: Nippon Telegraph and Telephone Corporation, Tokyo, Japan

[21] Appl. No.: 401,303

[22] Filed: Mar. 9, 1995

Related U.S. Application Data

[63] Continuation of Ser. No. 94,963, Jul. 22, 1993, abandoned.

[30] Foreign Application Priority Data

Jul. 31, 1992 [JP] Japan ................................ 4-204949
Jan. 6, 1993 [JP] Japan ................................ 5-000395

[51] Int. Cl.⁶ .............................. H04N 5/30; H04N 7/14
[52] U.S. Cl. ........................... 348/20; 359/618; 359/850
[58] Field of Search ............................. 348/12, 13, 15, 348/20, 207, 373, 375, 744, 752; 359/618, 566, 569, 570, 575, 850; H04N 7/14

[56] References Cited

U.S. PATENT DOCUMENTS

| | | | |
|---|---|---|---|
| 5,048,925 | 9/1991 | Gerritsen et al. | 359/569 |
| 5,117,285 | 5/1992 | Nelson et al. | 358/85 |
| 5,260,828 | 11/1993 | Londono et al. | 359/565 |

FOREIGN PATENT DOCUMENTS

| | | | |
|---|---|---|---|
| 0503432 | 9/1992 | European Pat. Off. | H04N 7/14 |
| 4150684 | 5/1992 | Japan | H04N 7/14 |
| 4145789 | 5/1992 | Japan | H04N 7/14 |
| 4315390 | 6/1992 | Japan | H04N 7/14 |

OTHER PUBLICATIONS

"Eyes Matching Image Pickup Display Device" by S. Shinichi, Pat. Abstracts of Japan, vol. 16, No. 432 (Sep. 9, 1992).
"Image Pickup Device for Bidirectional Picture Communication Displaying System," by I. Morihito, Pat. Abstr. of Japan, vol. 14, No. 190, (Apr. 18, 1990).
"Display and Image Pickup Device" by A. Hitoshi, Pat. Abstracts of Japan, vol. 17, No. 141, (Mar. 23, 1993).
"Display/Image Pickup Device" by Kuriki Masato et al., Pat. Abstr. of Japan, vol. 16, No. 432, (Sep. 9, 1992).

Primary Examiner—Wendy Greening
Assistant Examiner—Bipin Shalwala
Attorney, Agent, or Firm—Pollock, Vande Sande & Priddy

[57] ABSTRACT

A videocamera is disposed diagonally to the front of a display and the image of a subject is reflected toward the videocamera by a half-transparent mirror placed in front of the screen of the display. The half-transparent mirror has in its front inclined strip-like micro reflective surfaces and inclined strip-like micro transparent surfaces which emit therethrough incident light from the display screen. The angle between each micro transparent surface and a strip-like micro area formed on the back of the half-transparent mirror in opposing relation to the micro transparent surface is determined so that the half-transparent mirror has a light collecting or condensing effect.

9 Claims, 10 Drawing Sheets

DISPLAY AND IMAGE CAPTURE APPARATUS

This application is a continuation of U.S. patent application Ser. No. 08/094,963, filed Jul. 22, 1993, now abandoned.

BACKGROUND OF THE INVENTION

The present invention relates to a display and image capture apparatus which is used in visual telecommunication services such as videophones and teleconference services.

With recent developments of telecommunication technology such as video coding techniques, a two-way visual telecommunication system which links remote places through a video and audio communication network, such as a videophone or video teleconferencing system, has rapidly come into wide use. It is now being expected that the expansion of an integrated services digital network (ISDN) and the broadening of the transmission network therefor will make it possible to provide high-quality images which give callers the feeling of actually holding a face-to-face conversation.

FIG. 1 shows an ordinary display and image capture apparatus which is now used in the two-way visual telecommunication. In this apparatus a videocamera 20 is mounted on the top or one side of a CRT display or similar display 10 to capture the image of a user M. In the case of using such an apparatus, the user M is usually looking at the display 10 on which the image of the person he is talking to is being displayed, and hence he will not turn his gaze on the videocamera 20. Thus the eyes of the user M whose image is being displayed on a display of the receiving side at a remote place are not directed to the front—this results in a defect that the conversation between the callers is unnatural because they cannot make eye-contact with each other while speaking.

To offer a small and low-cost display and image capture apparatus which allows callers to look each other in the eyes, the inventor of this application has proposed an arrangement in which a half-transparent mirror, formed by a plurality of micro HMs with their reflecting surfaces inclined, are disposed in front of the display screen and the image of the user reflected by the half-transparent mirror is captured (Kuriki et al U.S. Pat. No. 5,317,405 issued May 31, 1994, corresponding to Japanese Patent Application Laid-Open No. 150684/92). FIGS. 2A and 2B show, in cross-section, two examples of such a conventional half-transparent mirror 3 comprised of micro HMs 3M and FIG. 3 shows the layout of a display and image capture apparatus employing the half-transparent mirror 3 depicted in FIG. 2A. The half-transparent mirror 3 is formed by an array of a number of strip-like micro HMs 3M with their reflecting surfaces inclined. That is, ridges 3R, saw-tooth in cross-section, are formed in parallel over the entire area of one surface of, for instance, a transparent plastic sheet 3B and thin half-transparent reflecting layers of aluminum or similar metal are coated on the slopes of the ridges 3R to form the micro HMs 3M. In FIGS. 2A and 2B the reference character θ indicates the angle of inclination of each micro HM 3M.

The half-transparent mirror 3 of such a construction as mentioned above is mounted on the front of the display 10. The videocamera 20 is placed in the direction in which light incident to the half-transparent mirror 3 from the front is reflected. Consequently, the user M is allowed to see the display screen of the display 10 through the half-transparent mirror 3 and a portion of the incident light is reflected in the direction of an angle 2θ as shown in FIG. 3; thus, the videocamera 20 disposed in that direction captures the image of the user M viewed from the front, enabling eye contact between callers.

However, since the ridges 3R covered with the micro HMs 3M in the conventional display and image capture apparatus each act as a prism to light transmitted through the half-transparent mirror 3, light from the display screen is bent downward in such a layout as shown in FIG. 3, posing a problem that the brightness of the lower part of the display screen decreases as the lower marginal edge of the screen is approached. This problem is not so serious in the case of a desk-top display because its display screen is relatively small, say, about 10 inches at the largest, but in the case of using a display whose screen size is in the range of from tens to hundreds of inches, such as a projector, the brightness at the middle and lower parts of the screen decreases substantially.

In the half-transparent mirror 3 of FIG. 2A the micro HMs 3M each serve both as a micro reflecting surface and a micro transmitting surface and reflect the image of the user M to the videocamera 20 while at the same time they permit the passage therethrough of the display image from the screen. In the half-transparent mirror of FIG. 2B each ridge 3R has two sloped surfaces 3M and 3T, the one sloped surface 3M is given a reflective coating for reflecting an image to the videocamera 20 and the other sloped surface 3T is used to emit transmitted light from the display screen. This half-transparent mirror can also be used with the display and image capture apparatus. The transmissivity of the micro reflecting surface 3M is so low as not to contribute to the observation of the display image, that is, its reflectivity is high. The micro reflecting surface 3M will also hereinafter be referred to as a micro HM as in the case of FIG. 2A. Also in the case of using the half-transparent mirror 3 depicted in FIG. 2B, transmitted light which is emitted from the micro transmitting surface 3T is bent upward by the prism effect of the ridge 3R as shown.

In FIG. 11 there is shown by white squares the brightness distribution of the display screen from its top to bottom area at its central part. As will be seen from FIG. 11, the brightness decreases toward the lower marginal edge of the display screen from its central portion, the brightness at the center of the screen at which the user looks most frequently is lower about 20% than the maximum brightness, and at the lower part the brightness is lower as much as 70% or more than the maximum value. For this reason, the display and image capture apparatus shown in FIG. 3 cannot be applied intact to a teleconference system or the like that calls for a large display screen.

SUMMARY OF THE INVENTION

It is therefore an object of the present invention to increase the brightness of a display image and improve the brightness distribution of the image being displayed on the display screen in a large-screen display and image capture apparatus which is used for a teleconference system or similar services and enables eye contact between callers through use of a micro half-transparent mirror array.

According to an aspect of the present invention, there is provided a display and image capture apparatus which includes a display, at least one image capture device or videocamera disposed diagonally to the front of the display and a half-transparent mirror disposed substantially in parallel to the display screen of the display, the half-transparent mirror being formed by an array of micro half-transparent mirror means each including a ridge having an inclined strip-like micro reflecting surface, and in which the image of a subject in front of the display is captured by the videocamera as a reflected image from the half-transparent mirror while at the same time an image on the display is transmitted through the half-transparent mirror and displayed. In this apparatus, the half-transparent mirror includes first and second areas and the half-transparent mirror means in the first area are so formed as to reflect the image of the subject to the videocamera, whereas the half-transparent mirror means in the both first and second areas are formed so that light beams incident thereto from the display screen are bent toward each other when emitted from the mirror means.

According to another aspect of the present invention, there is provided a display and image capture apparatus which includes a display, at least one image capture device or videocamera disposed diagonally to the front of the display and a half-transparent mirror disposed in front of or mounted on the front of the screen of the display, the half-transparent mirror being formed by an array of micro half-transparent mirror means each including a ridge having an inclined strip-like micro reflecting surface, and in which the image of a subject in front of the display is captured by the videocamera as a reflected image from the half-transparent mirror. In this apparatus, the micro half-transparent mirror means each have a strip-like micro transmitting surface directed to a predetermined direction for emitting therethrough light from the display screen and the angle between a strip-like micro area formed in the back of the half-transparent mirror just behind the micro transmitting surface and the micro transmitting surface itself varies on a stepwise basis from one end to the other of the half-transparent mirror in the direction of arrangement of the ridges so that light beams incident to the respective micro transmitting surfaces from the display screen are bent toward the center of the half-transparent mirror in front of it.

According to still another aspect of the present invention, there is provided a display and image capture apparatus which includes a display, at least one image capture device or videocamera disposed diagonally to the front of the display and a half-transparent mirror disposed in front of or mounted on the front of the screen of the display, the half-transparent mirror being formed by an array of micro half-transparent mirror means each including a ridge having an inclined strip-like micro reflecting surface, and in which the image of a subject in front of the display is captured by the videocamera as a reflected image from the half-transparent mirror. In this apparatus, the micro half-transparent mirror means each have a strip-like micro transmitting surface for emitting therethrough light from the display screen and a strip-like micro area formed in the back of the half-transparent mirror just behind the micro transmitting surface is parallel to the micro transmitting surface.

DESCRIPTION OF THE PREFERRED EMBODIMENTS

Figure 3:
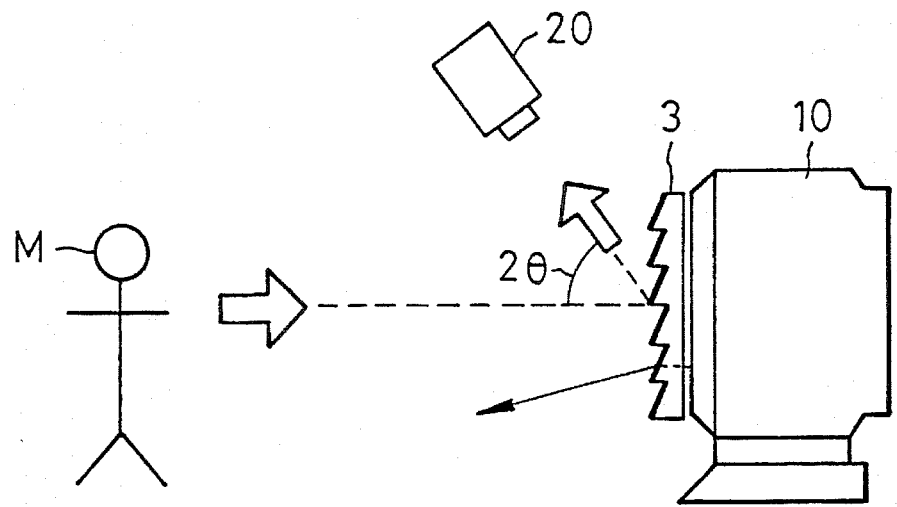
FIG. 3 is a side view showing a display and image capture apparatus which uses a micro half-transparent mirror array previously proposed to enable eye contact between callers.
Figure 4:
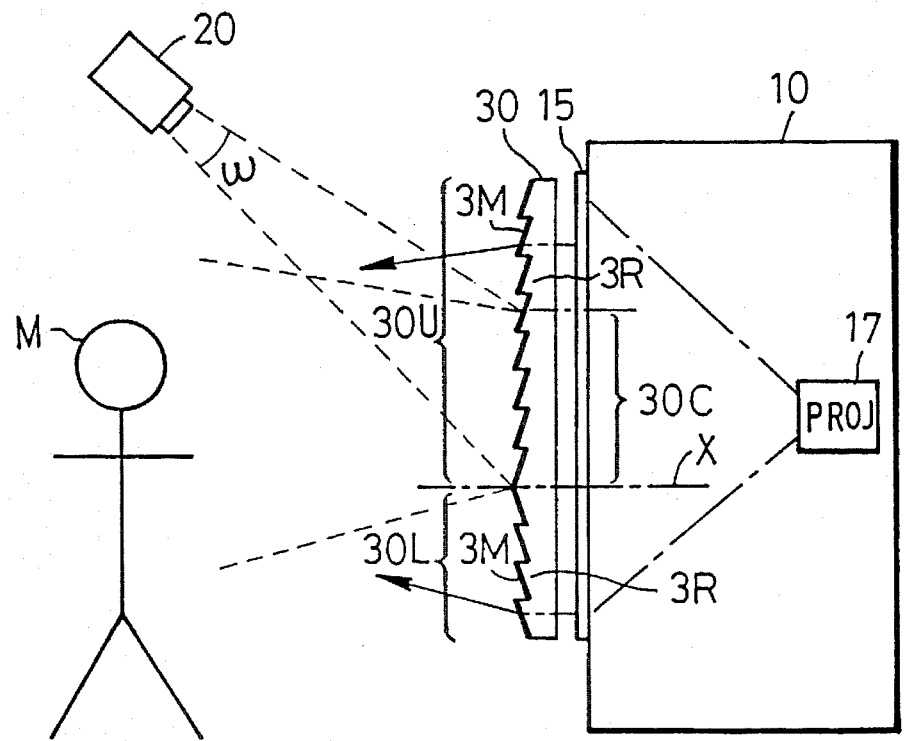
FIG. 4 is a side view illustrating an embodiment of the display and image capture apparatus according to the present invention.

FIG. 4 schematically illustrates a first embodiment of the display and image capture apparatus according to the present invention. The display 10 is, in this example, a projection display which is of the type that an image or picture is projected onto a screen 15 from a projector 17 provided inside the device. A half-transparent mirror 30, formed by a micro half-transparent mirror array (hereinafter referred to as a micro HM array), is disposed in front of the screen 15 in adjacent relation thereto, covering the entire area of the screen 15. As in the case of FIG. 3, a reflected image of a subject from the micro HM array is captured by, for example, a videocamera 20 placed diagonally above the micro HM array 30 and the resulting image signal is transmitted, together with a speech signal, from a transmitter-receiver (not shown) via a communication channel to a transmitter-receiver at a remote place.

Taking into account the fact that though dependent on the image-capturing angle of the field of the videocamera 20 and the size of the display screen 15, an area 30C on the screen 15, which is necessary for the image-capturing viewing angle ω of the videocamera 20 (which area will hereinafter be referred to as an image-capturing viewing area), is small relative to the screen 15 which is large as in the case of a projection display, the half-transparent mirror 30 in this embodiment has a configuration wherein, for instance, in the upper area 30U containing the image-capturing viewing area 30C the surfaces of micro HMs 3M are inclined upward to reflect the image of the subject toward the videocamera 20, whereas in the lower area 30L the surfaces of micro HMs 3M are inclined downward so that light incident thereto or transmitted therethrough from the display screen 15 is directed toward the user M, that is, bent upward in this example, by the prismatic effect of the respective ridges 3R. Hence, the half-transparent mirror 30 acts on the incident or transmitted light just like a cylindrical lens. With such a configuration of the half-transparent mirror 30, it is possible to obviate the defect that the display area of the screen 15 on the opposite side from the videocamera 20 is dark in a display using a large or extra large screen of a size ranging from tens to hundreds of inches.

Figure 5:
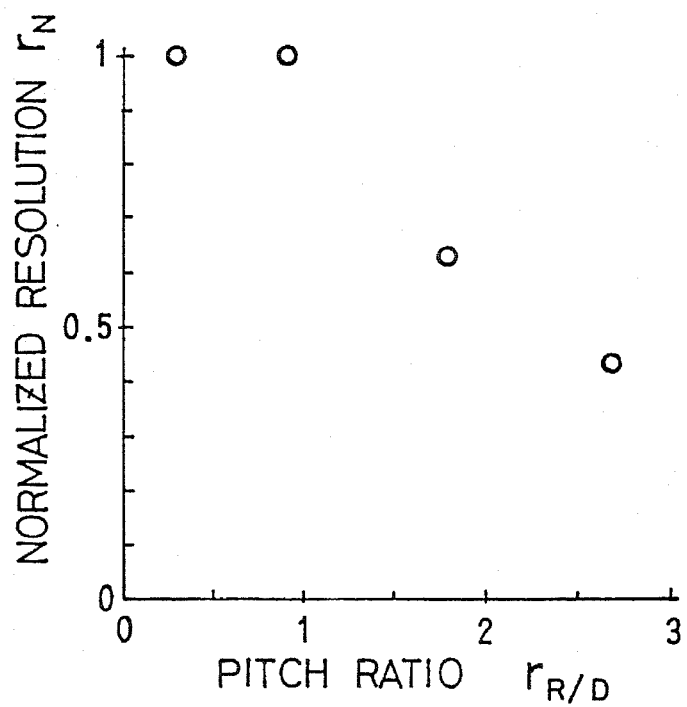
FIG. 5 is a graph showing the relationship between the pitch of ridges and the resolution of a display image.

FIG. 5 is a graph showing measured values which represent the relationship between the ratio, $r_{R/D}=P_R/P_D$, between the pitch $P_R$ (mm/line) of the ridges 3R of the micro HM array 3M and the resolution of the image displayed on the screen 15 (expressed by the pitch of display picture elements or pixels) and the normalized resolution, $r_N=P_M/P_D$, of the display image which is observed through the half-transparent mirror 30 (the resolution $P_M$ expressed by the pitch of the observed image being normalized by the pitch $P_D$ of the display pixels on the screen 15). When the ratio $r_{R/D}$ is smaller than 1, the normalized resolution $r_N$ is 1, and when the former is greater than 1, the latter is low. This means that when the pitch $P_R$ of the ridges 3R is smaller than the resolution (i.e. the pixel pitch) $P_D$ of the display screen 15, the resolution would not be deteriorated even if the half-transparent mirror 30 is disposed in front of the screen 15 and that as the pitch $P_R$ of the ridges 3R becomes larger than the resolution $P_D$ of the screen 15, the resolution of the display image which is observed through the half-transparent mirror 30 would be deteriorated. It is desirable, therefore, that the pitch $P_R$ of the ridges 3R be smaller than the resolution $P_D$ of the display image on the screen 15. For example, when the resolution $P_D$ of the display screen 15 is 1 mm/line, the pitch $P_R$ of the ridges 3R may preferably be selected smaller than 1 mm/line. The same is true of all half-transparent mirrors 30 that will hereinafter be described.

Figure 1:
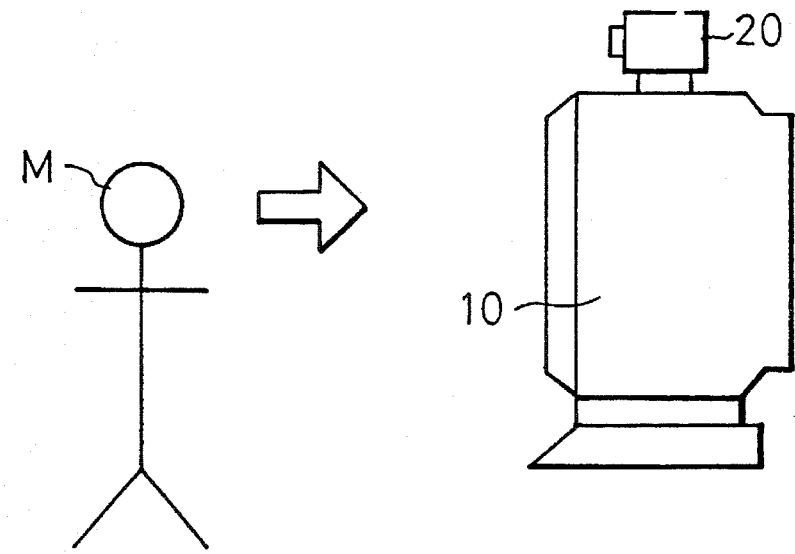
FIG. 1 is a side view showing a conventional display and image capture apparatus.
Figure 2A:
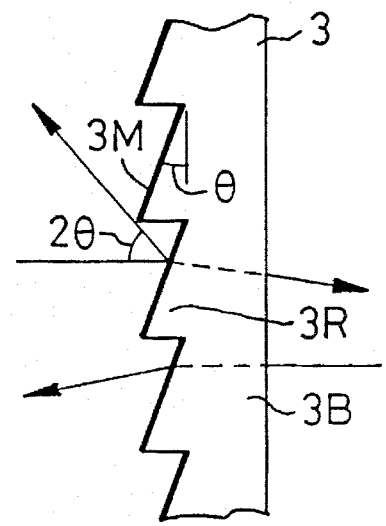
FIG. 2A is a vertical sectional view showing an example of conventional micro half-transparent mirror arrays.
Figure 2B:
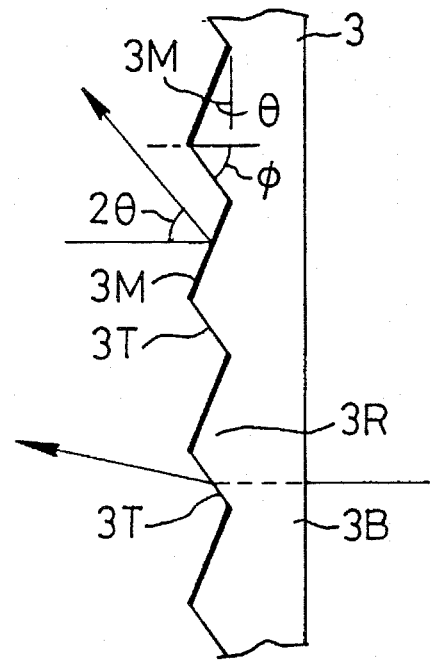
FIG. 2B is a vertical sectional view showing another example of a conventional micro half-transparent mirror array.
Figure 6:
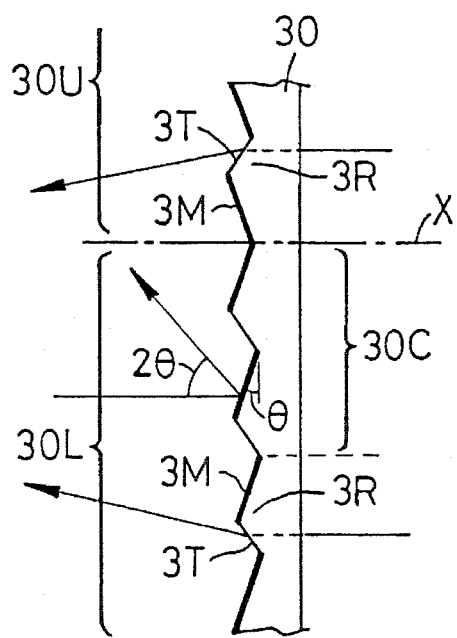
FIG. 6 is a vertical sectional view showing another example of a half-transparent mirror 30 for use in the apparatus of FIG. 4.

FIG. 6 illustrates, in vertical section, the half-transparent mirror 30 of a configuration which is an improvement of that of the mirror 30 shown in FIG. 2B through utilization of the idea of the half-transparent mirror 30 described above in conjunction with FIG. 4. In this example the image-capturing viewing area 30C is provided in the lower area 30L and in the area 30U above a boundary line X the micro HMs 3M are directed downward, whereas in the area 30L below the boundary line X the micro HMs 3M are directed upward. Hence, as shown in FIG. 6, light emitted from the micro transmitting surface 3T is bent downward in the upper area 30U but upward in the lower area 30L; thus, the light is collected in the vertical direction. This increases the quantity of light which reaches the user M from the area near the upper marginal edge of the screen 15.

In FIGS. 7A through 7E there are shown five other similar examples of the half-transparent mirror 30 for use in the FIG. 4 embodiment, together with the positional relationship of the videocamera 20 to the display screen in the respective examples. FIGS. 7A through 7D show the cases where the videocamera 20 is disposed diagonally above and below the front of the half-transparent mirror 30 and at an angle to the left and right of the half-transparent mirror 30, respectively. The respective half-transparent mirror 30, rectangular in shape, includes upper, lower, right and left areas 30U, 30L, 30R and 30F along its four sides and a central image-capturing viewing area 30C defined by them. In these four embodiments there are formed in the upper, lower, right and left areas 30U, 30L, 30R and 30F ridges which extend in parallel to the four sides, respectively, and have micro HMs which reflect light diagonally above and below the front of the half-transparent mirror 30 and at an angle to the right and left of the mirror 30, respectively, as indicated by the arrows. In the central area 30C there are formed ridges which have micro HMs of the same direction as that in the area near the videocamera 20. With such an arrangement, in each of the embodiments of FIGS. 7A through 7D the light transmitted through the half-transparent mirror 30 from the display screen can be bent in both vertical and horizontal directions and the central area 30C is allowed to reflect the image of the user M to the videocamera 20.

Figure 7A:
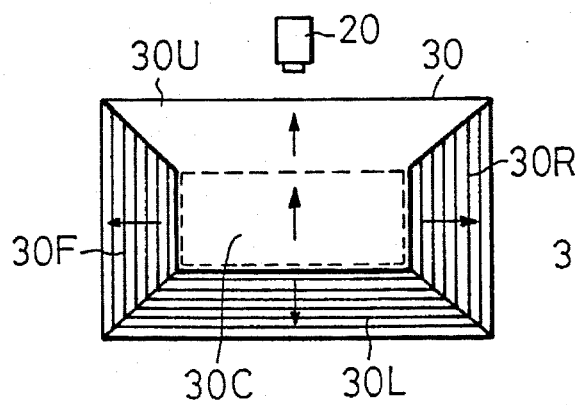
FIG. 7A is a front view showing the positional relationship between the half-transparent mirror 30 and a videocamera in the apparatus of FIG. 4.
Figure 7B:
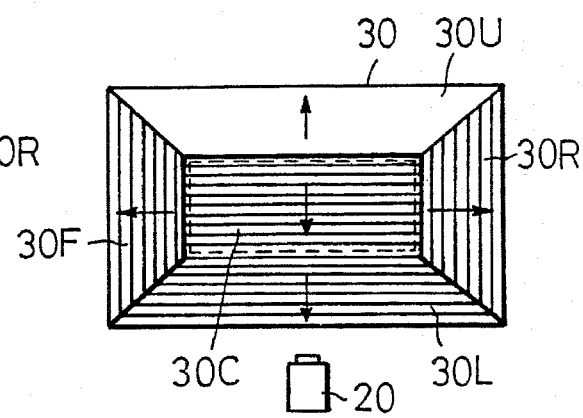
FIG. 7B is a front view showing the positional relationship between the half-transparent mirror 30 and the videocamera in the apparatus of FIG. 4.
Figure 7C:
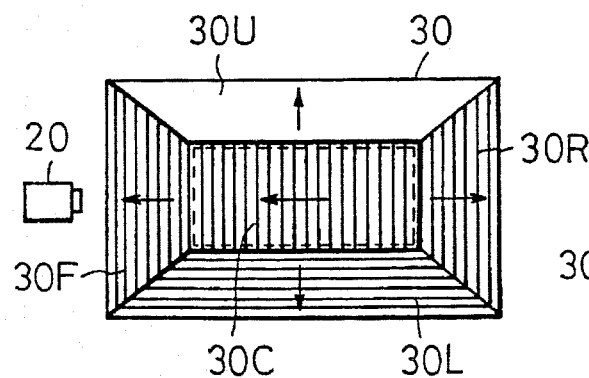
FIG. 7C is a front view showing the positional relationship between the half-transparent mirror 30 and the videocamera in the apparatus of FIG. 4.
Figure 7D:
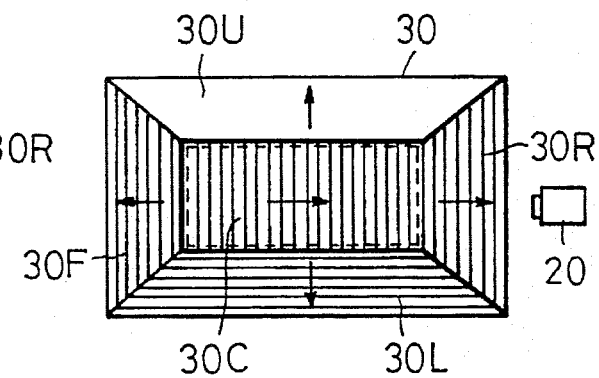
FIG. 7D is a front view showing the positional relationship between the half-transparent mirror 30 and the videocamera in the apparatus of FIG. 4.
Figure 7E:
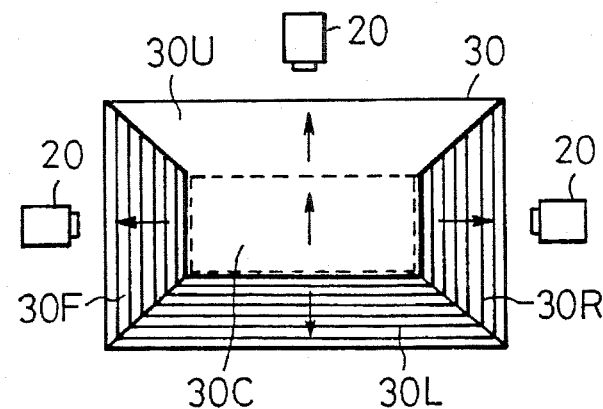
FIG. 7E is a front view showing another positional relationship between the half-transparent mirror 30 and videocameras in the apparatus of FIG. 4.

The half-transparent mirror 30 shown in FIG. 7E is identical in construction with the FIG. 7A embodiment but in this example additional videocameras 20 are disposed diagonally to the mirror 30 on the right and left sides thereof, respectively, so that the image of the subject can be captured from different directions. In this instance, it is possible, at the receiving side, to selectively switch the display image as desired or provide a multi-image display. The right-hand and left-hand videocameras 20 use the right and left areas 30R and 30F as their image-capturing viewing areas, respectively. While in the embodiments of FIGS. 7A to 7E the areas 30U, 30L, 30R and 30F are each shown to be formed by the micro HM array depicted in FIG. 2A, they may also be formed by the micro HM array shown in FIG. 2B. In such a case, the same condensing effect or light collecting effect as mentioned above could be obtained by reversing the directions of reflection in all of the areas indicated by the arrows, but the videocameras need to be shifted to the positions opposite to those shown.

Figure 8:
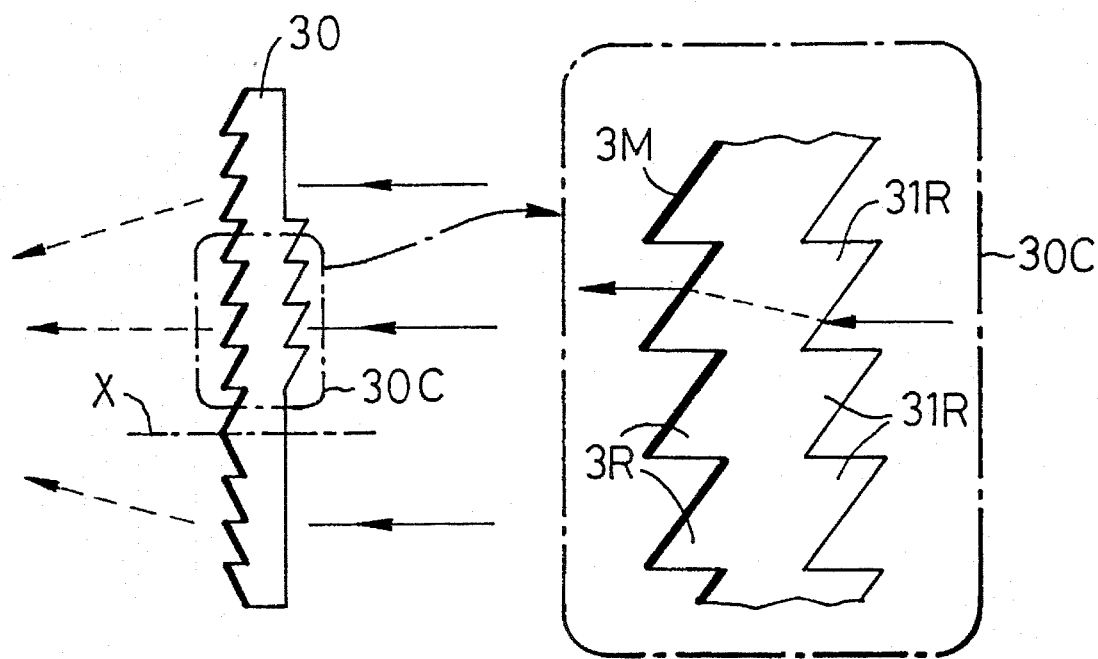
FIG. 8 is a vertical sectional view showing another example of half-transparent mirrors for use in the apparatus of FIG. 4.

FIG. 8 illustrates another example of the half-transparent mirror 30, in which there are formed in the back of the central area 30C ridges 31R constituting micro prisms which have slopes parallel to those forming the micro HMs 3M. Consequently, the direction of incidence of light to the micro prisms 31R and the direction of emission of the transmitted light from the micro HMs 3M are parallel to each other and the quantity of light that reaches the user M increases, enhancing the brightness of the display screen.

Figure 9:
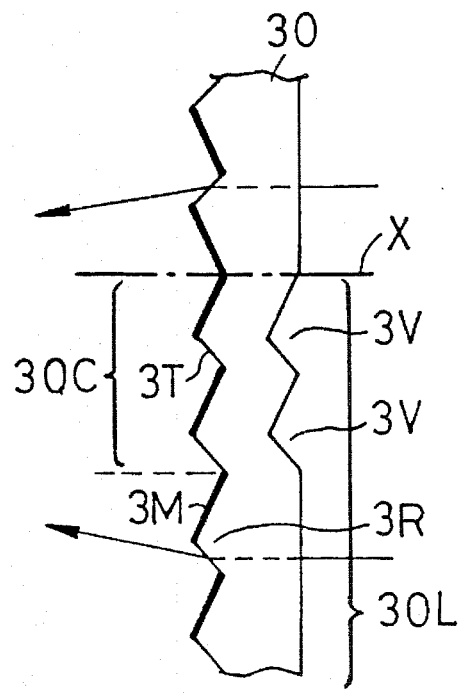
FIG. 9 is a vertical sectional view showing another example of half-transparent mirrors for use in the apparatus of FIG. 4.

FIG. 9 illustrates, in vertical section, a modified form of the half-transparent mirror 30 of FIG. 6, which utilizes the construction described above in connection with FIG. 8. In the area on the back of the mirror 30 which corresponds to the central area 30C set in the lower area 30L and including the image-capturing viewing area 30C, there are formed V-shaped grooves 3V each having two slopes parallel to the two slopes of the corresponding ridge 3R. Since the micro transmitting surface 3T of the ridge 3R and the corresponding slope of the V-shaped groove 3V are parallel to each other, the direction of incidence of light to the area defined by these parallel slopes and the direction of emission therefrom of transmitted light are parallel to each other. Hence, the light incident to the central area 30C of the half-transparent mirror 30 from the screen 15 (see FIG. 4) travels substantially straight to the user M. In consequence, the brightness at the central portion of the display screen 15 increases.

Figure 10:
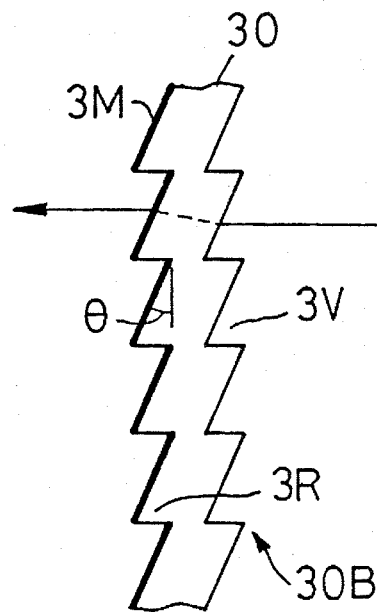
FIG. 10 is a vertical sectional view showing another example of half-transparent mirrors for use in the apparatus of FIG. 4.

FIG. 10 illustrates, in section, another example of the half-transparent mirror 30 for use in the display and image capture apparatus of FIG. 4. In the FIG. 10 embodiment the inclination angle θ of the micro HM 3M is fixed over the entire area of the half-transparent mirror 30 but the back 30B of the micro HM array 3M has grooves 3V corresponding to the ridges 3R on the front and each having a configuration complementary to the corresponding prismatic ridge 3R and the slope of the respective ridge 3R (i.e. the micro HM 3M) and the slope of the corresponding groove 3V are parallel to each other. With such a configuration of the half-transparent mirror 30, the light incident to the back 30B, that is, the display image, is not bent downward when emitted from the mirror 30; namely, it is emitted in parallel to the incident light though somewhat shifted downward. As a result, the reduction of the brightness on the display screen from its center to lower portion is less than in the case where no array of grooves 3V is formed in the back of the half-transparent mirror 30. In this embodiment the grooves 3V are cut in the back 30B of the half-transparent mirror 30, but this is equivalent to the formation of the ridges 31R which have slopes parallel to those of the ridges 3R on the front of the mirror 30, as described previously with respect to FIG. 8.

Figure 11:
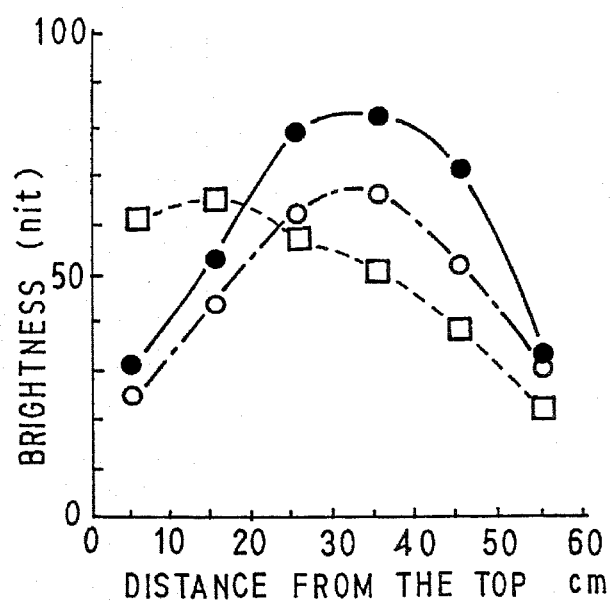
FIG. 11 is a graph showing the brightness distributions on the display screen in the prior art example of FIG. 3 and the apparatus of the present invention.

FIG. 11 shows the brightness distributions at the middle of the display screen from its upper to lower areas. The white circles indicate the brightness distribution obtained with the half-transparent mirror 30 of FIG. 10 and the white squares indicate the brightness distribution obtained with the prior art half-transparent mirror 3 which has no grooves 3V on the back thereof as depicted in FIG. 3. With the half-transparent mirror 30 of FIG. 10, the brightness is maximum at the center of the screen and the brightness distribution is symmetrical. This is substantially the same as the brightness distribution (not shown) on the screen of an ordinary display 10. It will be seen from FIG. 11 that the deviation of the brightness distribution, which is caused by the use of the conventional half-transparent mirror 3 shown in FIG. 3, can be suppressed by the present invention.

Figure 12:
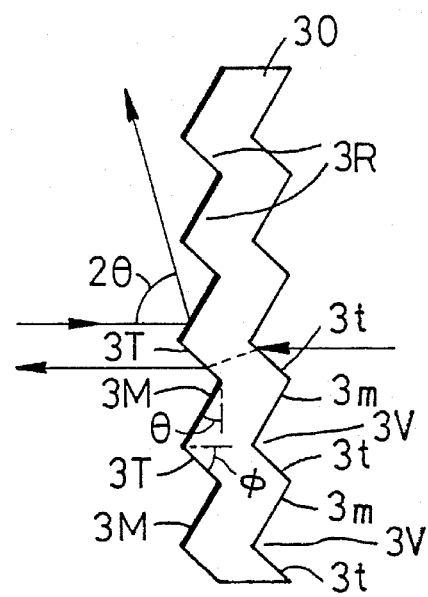
FIG. 12 is a vertical sectional view showing another example of half-transparent mirrors for use in the apparatus of FIG. 4.

FIG. 12 illustrates, in section, another example of the half-transparent mirror 30 for use in the display and image capture apparatus according to the present invention. As is the case with FIG. 2B, each ridge 3R has a slope forming the micro HM 3M and a slope 3T contiguous thereto at the tip of the ridge and inclined at an angle φ (where φ>0) to the horizontal direction. The reflectivity of the micro HM 3M is made high to such an extent that the light transmitted therethrough hardly contributes to the observation of the display image, and the display image is observed with the transmitted light which is emitted from the slope 3T not covered with a reflecting film. In the back of the half-transparent mirror 30 there are formed grooves 3V each having two slopes 3m and 3t parallel to slopes 3M and 3T of the corresponding ridge 3R on the front of the mirror 30, as in the case of the FIG. 10 embodiment. With the half-transparent mirror 30 of such a configuration, light incident to the slope 3t from the display screen 15 is emitted from the slope 3T in parallel to the incident light as shown in FIG. 12, and thus the brightness in the lower area of the display screen 15 as viewed from the user M can be improved.

Figure 13A:
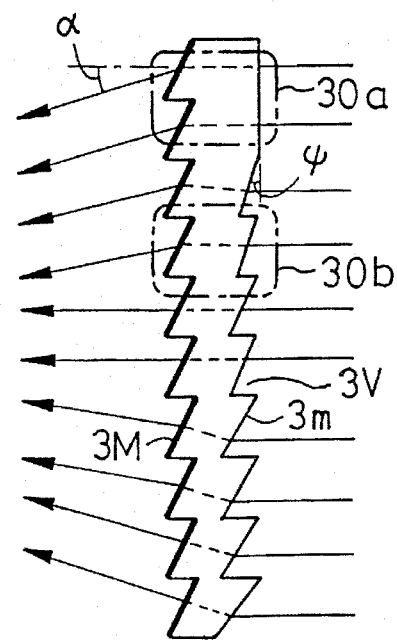
FIG. 13A is a vertical sectional view showing another example of half-transparent mirrors for use in the apparatus of FIG. 4.
Figure 13B:
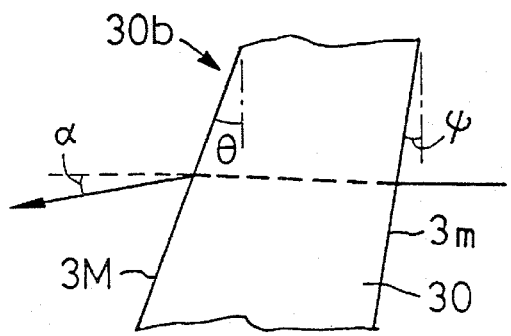
FIG. 13B is an enlarged diagram showing a portion 30*b* in FIG. 13A.

FIG. 13A illustrates, in section, another example of the half-transparent mirror 30 for use in the display and image capture apparatus according to the present invention. In the half-transparent mirror 30 of FIG. 10 the slope of each groove 3V cut in the back of the mirror 30 is parallel to the slope 3M of the corresponding ridge 3R on the front, but in the example of FIG. 13A the inclination angle ψ of the slope of the groove 3V is varied so that it becomes larger on a stepwise basis for each or every two or more grooves in the vertical direction. By changing the inclination of the slope of the groove 3V as mentioned above, the angle α of light emitted from the half-transparent mirror 30 with respect to the horizontal direction can be varied such that the light is bent more and more clockwise as the lower end of the mirror 30 is approached from its upper portion 30a with no groove formed in the back thereof as shown in FIG. 13A. FIG. 13B shows, on an enlarged scale, one portion 30b of the half-transparent mirror 30. Letting the inclination of the reflecting surface of the micro HM 3M and the refractive index of the half-transparent mirror 30 be represented by θ and n, respectively, the relationship between the angles α and ψ is expressed through the law of refraction as follows:

$$\alpha = \sin^{-1}\{n \cdot \sin(\theta - \psi + \psi')\} - \theta$$

where: $\sin\psi' = \sin\psi/n$

Thus, such a half-transparent mirror structure as shown in FIG. 13A allows the light transmitted therethrough from the display screen to be directed to the user M without the need of changing the angle θ of the reflecting surface of each micro HM 3M—this increases the brightness of the display screen and improves its brightness distribution. Although in FIG. 13A the inclination angle ψ of the slope of the groove 3V is shown to be changed in five steps, it is apparent that the deviation of the brightness distribution could be further reduced by changing the angle ψ at shorter intervals as in the case of the Fresnel lens.

Figure 14A:
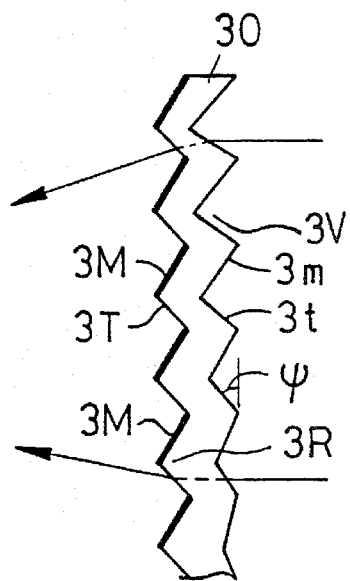
FIG. 14A is a vertical sectional view showing another example of half-transparent mirrors for use in the apparatus of FIG. 4.
Figure 14B:
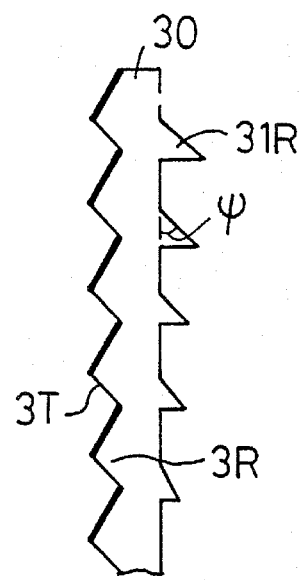
FIG. 14B is a vertical sectional view showing another example of half-transparent mirrors for use in the apparatus of FIG. 4.

FIG. 14A illustrates, in section, a modified form of the half-transparent mirror 30 of FIG. 6, wherein the inclination angle ψ of the slope 3t of the groove 3V cut in the back of the mirror 30 just behind the micro transmitting surface 3T of each ridge 3R is changed on a stepwise basis from the top to the bottom of the mirror 30 as in the case of FIG. 13A. The half-transparent mirror 30 of such a construction acts just like a cylindrical lens in its entirety, heightening the effect of collecting light in the vertical direction. FIG. 14B illustrates, in section, another example of the half-transparent mirror 30 wherein the same effect as that obtainable with the mirror structure of FIG. 14A is produced by forming the prismatic ridges 31R (see FIG. 8) over the entire area of the back of the mirror structure, with the inclination angle ψ of their slopes changed step by step.

Figure 15:
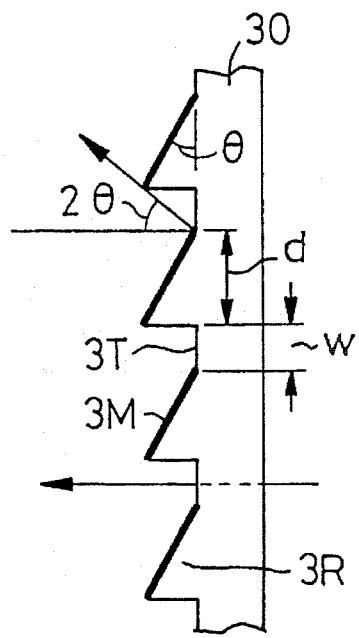
FIG. 15 is a vertical sectional view showing another example of half-transparent mirrors for use in the apparatus of FIG. 4.

FIG. 15 illustrates, in vertical section, a modified or improved version of the conventional half-transparent mirror 30 of FIG. 2B, wherein the portion forming the inclined micro transmitting surface 3T of each ridge 3R in FIG. 2B is removed to form a micro transmitting surface 3T which extends in parallel to the back of the mirror structure. The relationship between the width w of the micro transmitting surface 3T and the width d of the micro reflecting surface 3M is selected as follows:

$$w = d \cdot \tan\theta \cdot \tan 2\theta.$$

By this, it is possible to satisfy a condition that each micro transmitting surface 3T, viewed from the videocamera 20, will be shaded with the ridge 3R, that is, no ghost of the display image will be produced, and at the same time, the width w of the micro transmitting surface 3T can be made maximum with respect to the width d of the micro reflecting surface 3M. As long as the width w of the micro transmitting surface 3T is chosen equal to or smaller than the value that satisfies the above equation, no ghost of the display image will be produced. In this example, since the micro transmitting surface 3T is parallel to the back of the half-transparent mirror 30, the direction of incidence of light to the mirror 30 from the display screen and the direction of emission of the light from the mirror 30 are parallel to each other—this prevents the reduction of the brightness in the lower part of the screen which is caused in the prior art example of FIG. 3.

Figure 16:
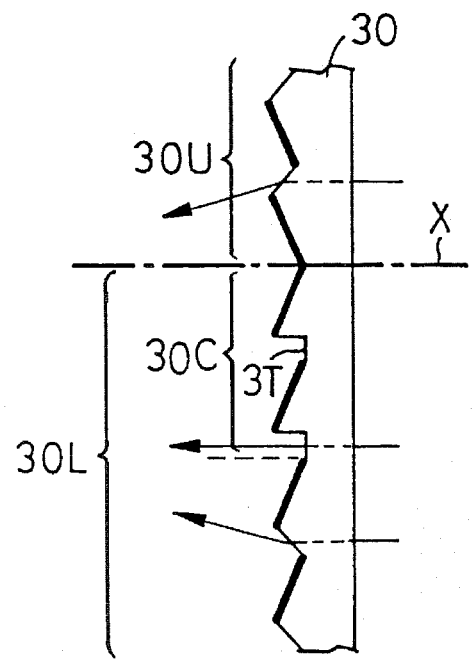
FIG. 16 is a vertical sectional view showing another example of half-transparent mirrors for use in the apparatus of FIG. 4.

FIG. 16 illustrates, in section, another example of the half-transparent mirror 30, wherein the mirror structure of FIG. 15 is applied to the central image-capturing viewing area 30C of the half-transparent mirror 30 of FIG. 6 so that in the upper area 30U and the lower area 30L below the image-capturing viewing area 30C the light transmitted therethrough is bent toward the center axis X, whereas in the central area 30C the light transmitted therethrough is not bent.

The half-transparent mirror structures of FIGS. 4, 7A to 7E, 8, 10 and 13A have a shortcoming that the brightness of the display image to be observed by the user M decreases when the reflectivity of the micro reflecting surface 3M is increased, that is, when its transmissivity is decreased, so as to prevent the production of ghosts of the display image on the screen 15 of the display 10 by the videocamera 20. On the other hand, the mirror structures of FIGS. 6, 9, 12, 14A, 14B, 15 and 16 have an advantage that a decrease in the transmissivity of the micro reflecting surface 3M will not cause a substantial decrease in the brightness, because the reflecting surface 3M and the transmitting surface 3T are formed separately of each other. For example, when the inclination angles θ and φ of the micro reflecting surface 3M and the micro transmitting surface 3T in FIG. 12 are 25° and 50°, respectively, the transmissivity of the half-transparent mirror 30 can be made about 40% as a whole, and when the angles θ and φ are 30° and 60°, respectively, the transmissivity can be made 50% or so. Indicated by the black circles in FIG. 11 is the brightness distribution of the display screen obtained in the case of using the half-transparent mirror 30 shown in FIG. 12. It will be seen that the brightness itself is improved as a whole though its distribution does not largely differ in shape from that obtained with the use of the half-transparent mirror 30 depicted in FIG. 10. Incidentally, the transmissivity can be raised by increasing the inclination angle φ of the micro transmitting surface 3T, but ghost images will be produced on the display screen unless the angle φ is selected smaller than 2θ.

Figure 17A:
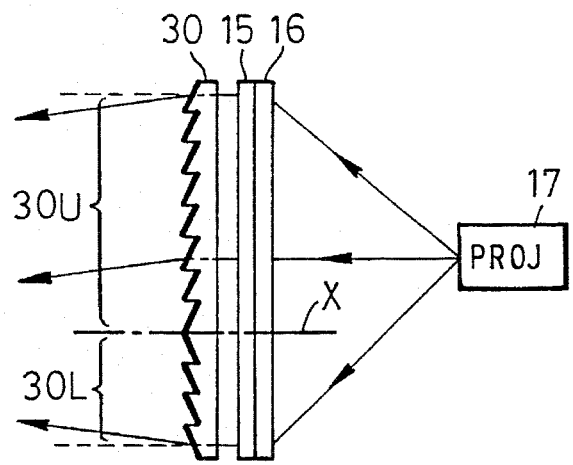
FIG. 17A is a vertical sectional view illustrating the principal part of another embodiment according to the present invention.
Figure 17B:
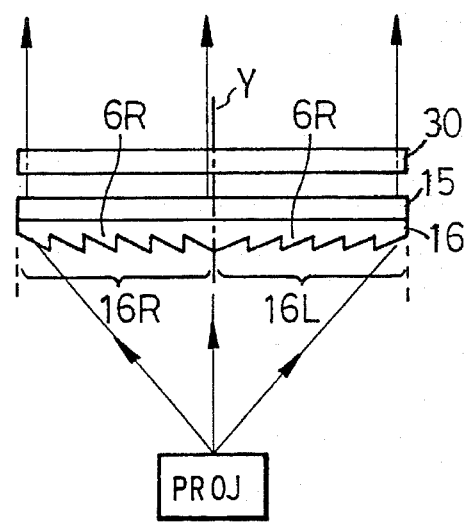
FIG. 17B is its horizontal sectional view.

FIGS. 17A and 17B illustrate the principal part of a modified form of the FIG. 4 embodiment. This modification is intended to heighten the light collecting or condensing effect by mounting a micro prism array 16 on the back of the screen 15 in the embodiment of FIG. 14. FIG. 17A shows, in vertical section, the half-transparent mirror 30, the screen 15 and the micro prism array 16 disposed adjacent one another and FIG. 17B shows them in horizontal section. As described previously in respect of the FIG. 4 embodiment, the half-transparent mirror 30 possesses the effect of collecting light about the boundary line X in the vertical direction because the upper area 30U and the lower area 30L bend downward and upward, respectively, the light transmitted therethrough. In this embodiment, the micro prism array 16 that is provided is made up of ridges 6R formed in one side of a plastics sheet, the ridges 6R constituting individual micro prisms and extending in parallel in the vertical direction. In the right-hand and left-hand areas 16R and 16L of the micro prism array 16 the micro prisms 6R have their slopes directed outward with respect to the center line Y. Consequently, light transmitted through each of the right-hand and left-hand areas of the micro prism array 16 is bent toward the center line Y; namely, the micro prism array 16 has the light collecting capability. A combination of the light collecting effect in the horizontal direction by the micro prism array 16 and the light collecting effect in the vertical direction by the micro HM array 30 provides a light collecting effect close to that obtainable with the Fresnel lens.

Conventionally, the display screen of a projecting type display is composed of a Fresnel lens, a diffuser (or diffuse layer) and a lenticular lens, and the light projected thereto is collected or condensed by the Fresnel lens to provide for increased brightness of the display screen. According to the embodiment shown in FIGS. 17A and 17B, the same effect as is obtainable with the use of the Fresnel lens could be produced by using the micro prism array 16 in place of the Fresnel lens in combination with the half-transparent mirror 30.

Figure 18A:
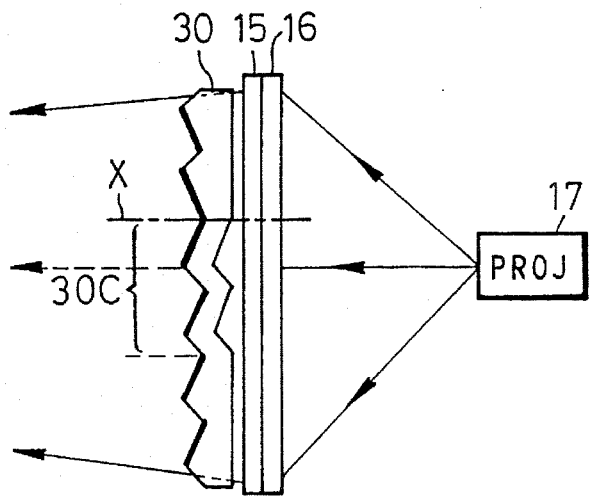
FIG. 18A is a vertical sectional view illustrating the principal part of another embodiment according to the present invention.
Figure 18B:
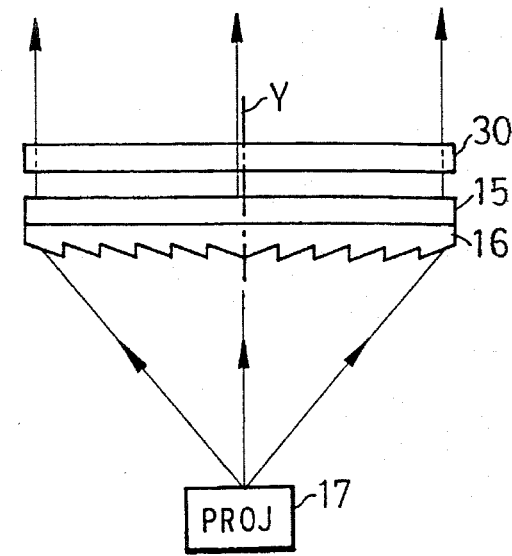
FIG. 18B is its horizontal sectional view.

FIGS. 18A and 18B illustrate, in vertical section and in horizontal section, the principal part of a modification of the FIG. 17 embodiment, wherein the half-transparent mirror 30 in FIG. 17 is replaced by the mirror 30 shown in FIG. 9. In this instance, the brightness of the central area 30C of the display screen 15 is further improved. It is evident that the prism array described above in connection with FIGS. 17A and 17B can be used in combination with any of the half-transparent mirrors depicted in FIGS. 6, 8, 10, 12, 13A, 14A, 14B, 15 and 16.

As described previously, the image-capturing viewing area 30C necessary for capturing the reflected image is, for instance, only the central area of the half-transparent mirror 30, and hence the micro reflecting surfaces 3M for the formation of the reflected image in the other areas do not contribute to the image capturing. Hence, the coating of the reflective films on the slopes in the areas except the central area 30C for image-capturing use, in the aforementioned various half-transparent mirrors 30, can be replaced with the formation of light absorbing layers (or black layers) on the slopes.

Figure 19A:
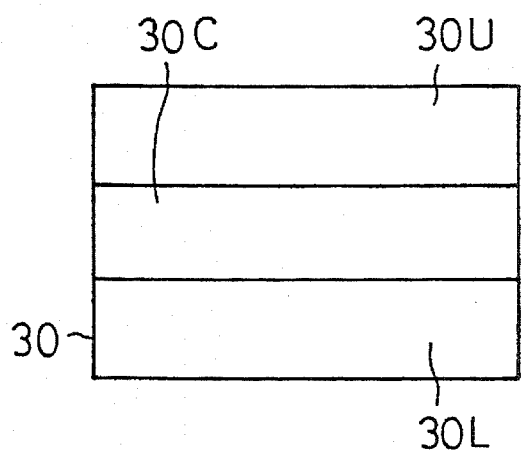
FIG. 19A is a front view illustrating another example of half-transparent mirrors for use in the apparatus of FIG. 4.
Figure 19B:
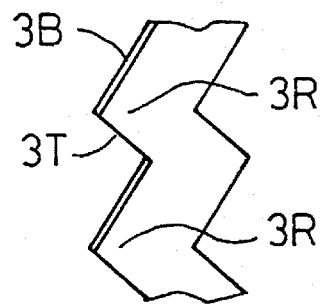
FIG. 19B is an enlarged vertical sectional view showing a portion of the half-transparent mirror of FIG. 19A outside an image-capturing viewing area.

For example, in the FIG. 12 embodiment the micro reflecting surface 3M and the micro transmitting surface 3T are formed in each ridge 3R over the entire area of the half-transparent mirror 30, but it is also possible to employ such a construction as shown in FIG. 19A wherein the micro reflecting surfaces 3M are provided only within the central area 30C including the image-capturing viewing area for image-capturing use and the light absorbing surfaces 3B in place of the micro reflecting surfaces 3T in the areas 30U and 30L which are not used for image capturing. For instance, even if the light absorbing layer 3B is provided on the one slope of each ridge 3R by giving it a black coating or forming a diffuse layer in place of the total reflecting coating as depicted in FIG. 19B which shows, in section, a portion of one of the areas 30U and 30L, the function of the half-transparent mirror 30 will not be impaired.

Figure 19C:
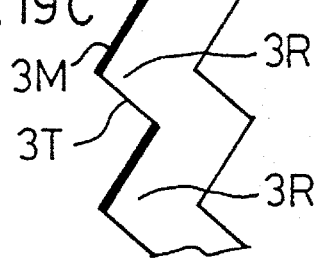
FIG. 19C is an enlarged vertical sectional view showing a portion of the half-transparent mirror of FIG. 19A inside the image-capturing viewing area.

Furthermore, in the central area 30C the reflectivity of the micro reflecting surface 3M can be increased and at the same time the brightness of the display screen can be further enhanced as will be seen from FIG. 19C. In the case where the half-transparent mirror 30 is of such a structure as shown in FIG. 10, when the user M looks at the lower part of the display screen, light reflected by the micro reflecting surfaces 3M, incident thereto from ceiling illumination, for instance, enters his eyes, introducing the possibility of deteriorating the image quality on the screen. However, the arrangement shown in FIGS. 19A, 19B and 19C prevents the reflection of external light in the areas 30U and 30L, and hence has the advantage of preventing the deterioration of the image quality on the screen. In the half-transparent mirrors 30 shown in FIGS. 6, 9, 12, 14A, 14B, 15 and 16 the micro reflecting surface 3M and the micro transmitting surface 3T are formed separately of each other; so that when the construction of FIG. 19A is applied to such mirrors 30, the light transmissivity of the light absorbing surface 3B can be made substantially 100%, but in the case of applying the FIG. 19A structure to the half-transparent mirror employing micro HMs of the type that the reflecting surface is used also as the transmitting surface, the transmissivity of the light absorbing surface 3B is selected substantially equal to the transmissivity in the image-capturing viewing area 30C.

Figure 20:
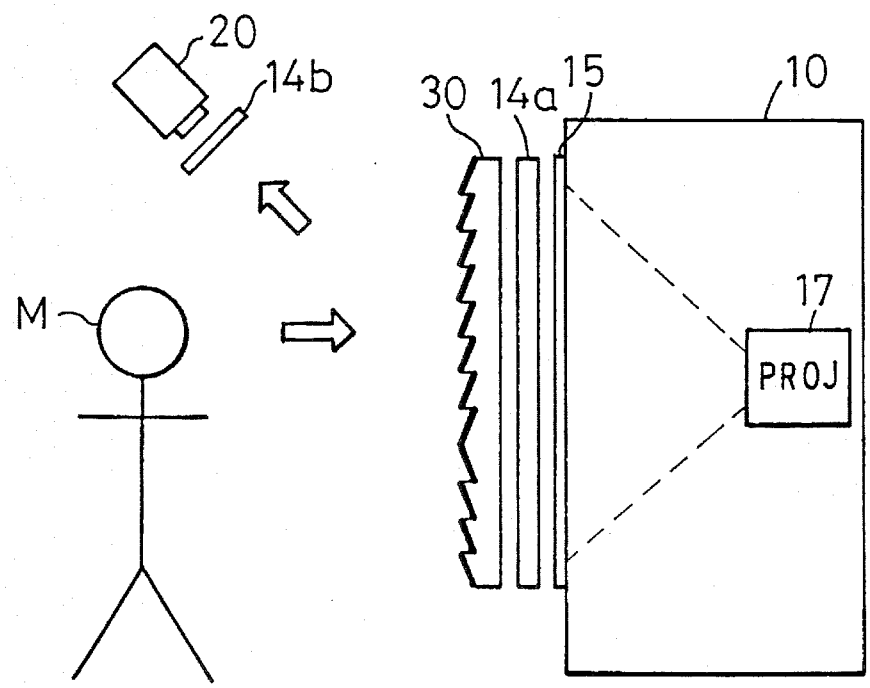
FIG. 20 is a side view illustrating another embodiment of the present invention.

FIG. 20 illustrates another embodiment of the display and image capture apparatus according to the present invention, which is designed to prevent the videocamera 20 from capturing ghost images on the display screen 15 in the embodiment of FIG. 4. To this end, a polarizer 14a is interposed between the screen 15 and the half-transparent mirror 30 and another polarizer 14b is placed in front of the videocamera 20. The polarizers 14a and 14b are disposed so that their directions of polarization are perpendicular to each other. Hence, in this embodiment no light is allowed to enter into the videocamera 20 from the display 15 and no ghost images on the display 15 are captured by the camera 20. Moreover, since the half-transparent mirror 30 directs the light from the display screen 15 toward the user M as mentioned previously, the provision of the polarizer 14a does not seriously decrease the brightness of the display 15 and the brightness in this case is about the same as that in the case where the half-transparent mirror 30 and the polarizer 14a are not used.

Furthermore, when a liquid crystal projector is used as the projector 17 in the display 10, an image by polarized light is projected onto the screen 15. In this instance, by making provision for polarizing the light from the screen 15 at right angles to the direction of polarization of the polarizer 14b, it is possible to omit the polarizer 14a and hence make the screen brighter. This embodiment is shown to use the half-transparent mirror 30 shown in FIG. 4 but it is apparent that it can be replaced with the aforementioned various half-transparent mirrors or combined with such micro prism arrays 16 as depicted in FIGS. 17A and 18A. At any rate, these half-transparent mirrors and combinations are applicable to the display and image capture apparatus of the type employing a projection type display as the display 10.

Figure 21A:
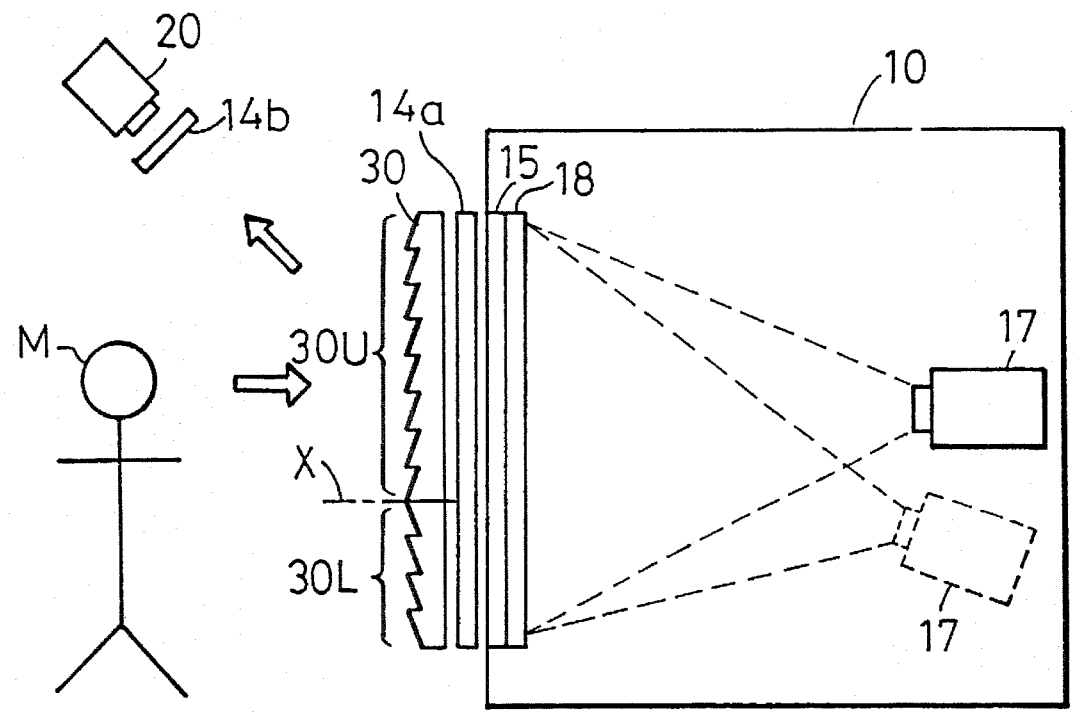
FIG. 21A is a side view illustrating still another embodiment of the present invention.
Figure 21B:
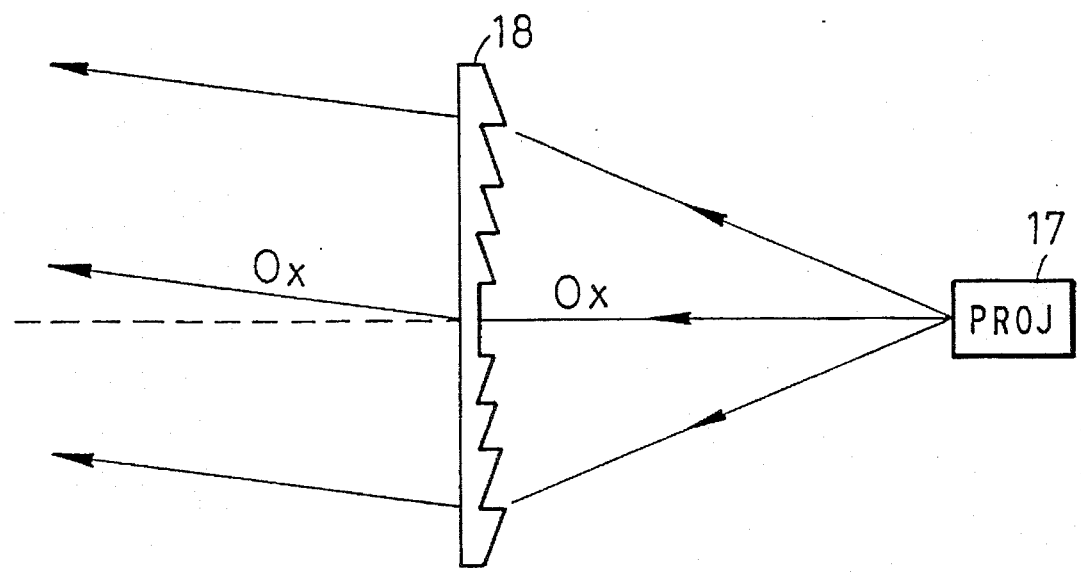
FIG. 21B is a sectional view showing an example of Fresnel lenses for use in the embodiment of FIG. 21A.

While in the FIGS. 17A and 17B embodiments the micro prism array 16, which directs light toward the user M in the lateral direction, is provided on the back of the screen 15, the micro prism array 16 may also be replaced by a Fresnel lens 18 as shown in FIG. 21A. In such a case, by using a Fresnel lens whose outgoing optical axis Ox bends upward as shown in FIG. 21B, it is possible to cancel the downward bending of transmitted light in the upper area 30U of the half-transparent mirror 30 and, at the same time, facilitate the upward bending of transmitted light in the lower area 30L. When the Fresnel lens 18 has a straight optical axis, the above-noted results could be obtained by placing the projector 17 below the level of the center of the display screen 15 as indicated by the broken lines in FIG. 21A.

Although the foregoing examples have been described to use the half-transparent mirror or micro HM array 30 of the type reflecting the image of the subject upward, the same results as mentioned above could be obtained with the use of a half-transparent mirror structure which reflects the image of the subject downward, rightward or leftward. The display 10 need not be limited specifically to the projection type display exemplified in the foregoing but other types of displays can be employed, and it is evident that displays of relatively small screen sizes may be used with the apparatus of the present invention.

As described above, the display and image capture apparatus according to the present invention enables eye contact between callers and permits reduction of a deviation of the brightness distribution which is caused by the use of the micro HM array.

It will be apparent that many modifications and variations may be effected without departing from the scope of the novel concepts of the present invention.

What is claimed is:

1. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments disposed on the front surface of said half-transparent mirror substantially in parallel to one another, each of which segments extends horizontally of said large-sized display screen and has a micro width vertically thereof, the front surface of each of said strip-like micro half-transparent mirror segments being inclined forward in vertical section thereof and having a reflecting surface formed on the inclined surface for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

said strip-like micro half-transparent mirror segments of said half-transparent mirror being continuously disposed in vertical direction, the inclined front surfaces of the half-transparent mirror segments at least positioned at said central area of said display screen surface which is within said angle of field of image capture of said image capturing means protruding in the same direction and being oriented at a predetermined fixed angle, and having half-transparent reflecting surfaces formed thereon for reflecting a portion of light from said subject and for transmitting therethrough a portion of light from said image on said large-sized display screen, respectively; and said half-transparent mirror further comprising a multiplicity of strip-like micro recesses formed in a central region of the back of said half-transparent mirror in opposing relation to said central area of said display screen surface, said strip-like micro recesses being formed in opposing relation to said half-transparent mirror segments positioned at said central area of said display screen surface and having substantially the same widths as those of said strip-like micro half-transparent mirror segments opposed thereto, respectively, said strip-like micro recesses having inclined surfaces oriented in the same direction as that of said strip-like micro half-transparent mirror segments, respectively, the number of said strip-like micro recesses being substantially the same as that of said half-transparent mirror segments positioned at said central area of said display screen surface, angles of said inclined surfaces of said strip-like micro recesses being changed to become larger or smaller on a stepwise basis in the vertical direction.

2. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments continuously disposed on the front surface of said half-transparent mirror vertically of said large-sized display screen and substantially in parallel to one another, each of said strip-like micro half-transparent mirror segments consisting of a strip-like micro reflecting segment which extends horizontally of said large-sized display screen and has a micro width vertically thereof and a strip-like micro light transmitting segment formed adjacent to said strip-like micro reflecting segment which also extends horizontally of said large-sized display screen and has a micro width vertically thereof, the front surface of said micro reflecting segment of each of said half-transparent mirror segments being inclined forward in vertical section thereof and having a reflecting surface formed on the inclined surface for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

the inclined front surfaces of said micro reflecting segments of said half-transparent mirror segments at least positioned at said central area of said display screen surface which is within said angle of field of image capture of said image capturing means protruding in the same direction and being oriented at a predetermined fixed angle, respectively; and said micro light transmitting segments of said half-transparent mirror segments at least positioned at said central area of said display screen surface being formed in parallel with a flat back surface of said half-transparent mirror, the inclination angle $\theta$ of each micro reflecting segment, the width d of each micro reflecting segment in the vertical direction and the width w of each micro light transmitting segment being so selected that they satisfy the following equation:

$$w \leq d \cdot \tan\theta \cdot \tan 2\theta.$$

3. A display and image capture apparatus comprising:

display means provided with a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments disposed on the front surface of said half-transparent mirror substantially in parallel to one another, each of which segments extends horizontally of said large-sized display screen and has a micro width vertically thereof, the front surface of each of said strip-like micro half-transparent mirror segments being inclined forward in vertical section thereof and having a reflecting surface formed on the inclined surface for reflecting a portion of light from said subject;

at least one image capturing means, disposed diagonally to the front of said large-sized display screen so as to have at least a central area of the display screen surface within the angle of field of image capture of said image capturing means, said image capturing means receiving light reflected from said half-transparent mirror and capturing the image of said subject;

said strip-like micro half-transparent mirror segments of said half-transparent mirror being continuously disposed in vertical direction, the inclined front surfaces of the half-transparent mirror segments at least positioned at said central area of said display screen surface which is within said angle of field of image capture of said image capturing means protruding in the same direction and being oriented at a predetermined fixed angle, and having half-transparent reflecting surfaces formed thereon for reflecting a portion of light from said subject and for transmitting therethrough a portion of light from said image on said large-sized display screen, respectively; and said half-transparent mirror further comprising a multiplicity of strip-like micro recesses formed in a central region of the back of said half-transparent mirror in opposing relation to said central area of said display screen surface, said strip-like micro recesses being formed in opposing relation to said half-transparent mirror segments positioned at said central area of said display screen surface and having substantially the same widths as those of said strip-like micro half-transparent mirror segments opposed thereto, respectively, said strip-like micro recesses having inclined surfaces oriented at said predetermined fixed angle in the same direction as that of said strip-like micro half-transparent mirror segments, respectively, the number of said strip-like micro recesses being substantially the same as that of said half-transparent mirror segments positioned at said central area of said display screen surface.

4. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments disposed on the front surface of said half-transparent mirror substantially in parallel to one another, each of such segments extending horizontally of said large-sized display screen and having a micro width vertically thereof, the front surface of each of said strip-like micro half-transparent mirror segments being inclined forward in vertical section thereof and having a reflecting surface formed on the inclined surface for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

said strip-like micro half-transparent mirror segments of said half-transparent mirror being continuously disposed in vertical direction, the inclined front surfaces of the half-transparent mirror segments at least positioned at said central area of said display screen surface which is within said angle of field of image capture of said image capturing means protruding in the same direction and being oriented at a predetermined fixed angle, and having half-transparent reflecting surfaces formed thereon for reflecting a portion of light from said subject and for transmitting therethrough a portion of light from said image on said large-sized display screen, respectively; and said half-transparent mirror further comprising a multiplicity of strip-like micro ridges formed in a central region of the back of said half-transparent mirror in opposing relation to said central area of said display screen surface, said micro ridges being formed in opposing relation to said half-transparent mirror segments positioned at said central area of said display screen surface and having inclined surfaces oriented in the same direction as that of said half-transparent mirror segments opposed thereto, respectively, said micro ridges having substantially the same widths as those of said half-transparent mirror segments opposed thereto, respectively, the number of said micro ridges being substantially the same as that of said half-transparent mirror segments positioned at said central area of said display screen surface, angles of the inclined surfaces of said micro ridges opposed to said half-transparent mirror segments being changed to become larger or smaller on a stepwise basis in vertical direction.

5. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments disposed on the front surface of said half-transparent mirror substantially in parallel to one another, each of said segments extending horizontally of said large-sized display screen and having a micro width vertically thereof, the front surface of each of said strip-like micro half-transparent mirror segments being inclined forward in vertical section thereof and having a reflecting surface formed on the inclined surface for reflecting a portion of light from said subject;

at least one image capturing means, disposed diagonally to the front of said large-sized display screen so as to have at least a central area of the display screen surface within the angle of field of image capture of said image capturing means, said image capturing means receiving light reflected from said half-transparent mirror and capturing the image of said subject;

said strip-like micro half-transparent mirror segments of said half-transparent mirror being continuously disposed in vertical direction, the inclined front surfaces of the half-transparent mirror segments at least positioned at said central area of said display screen surface which is within said angle of field of image capture of said image capturing means protruding in the same direction and being oriented at a predetermined fixed angle, and having half-transparent reflecting surfaces formed thereon for reflecting a portion of light from said subject and for transmitting therethrough a portion of light from said image on said large-sized display screen, respectively; and said half-transparent mirror further comprising a multiplicity of strip-like micro ridges formed in a central region of the back of said half-transparent mirror in opposing relation to said central area of said display screen surface, said strip-like micro ridges being formed in opposing relation to said half-transparent mirror segments positioned at said central area of said display screen surface and having substantially the same widths as those of said strip-like half-transparent mirror segments opposed thereto, respectively, said micro ridges having inclined surfaces oriented at said predetermined fixed angle in the same direction as that of said strip-like micro half-transparent mirror segments, respectively, the number of said micro ridges being substantially the same as that of said half-transparent mirror segments positioned at said central area of said display screen surface.

6. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments continuously disposed on the front surface of said half-transparent mirror vertically of said large-sized display screen and substantially in parallel to one another, each of said strip-like micro half-transparent mirror segments consisting of a strip-like micro reflecting segment which extends horizontally of said large-sized display screen and has a micro width vertically thereof and a strip-like micro light transmitting segment formed adjacent to said strip-like micro reflecting segment which also extends horizontally of said large-sized display screen and has a micro width vertically thereof, the front surface of said micro reflecting segment and the front surface of said micro light transmitting segment of each of said half-transparent mirror segments protruding forward and being inclined in opposite directions to each other in vertical sections thereof, the inclined front surface of each of said micro reflecting segments having a reflecting surface formed thereon for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

the inclined front surfaces of said micro reflecting segments of said half-transparent mirror segments at least positioned at said central area of said display screen surface which is within said angle of field of image capture of said image capturing means being oriented at a predetermined fixed angle and in the same direction, respectively; and said half-transparent mirror further comprising a multiplicity of strip-like micro recesses formed in a central region of the back of said half-transparent mirror in opposing relation to said central area of said display screen surface, said strip-like micro recesses being formed in opposing relation to said half-transparent mirror segments positioned at said central area of said display screen surface, each micro recess having an inclined surface oriented at said predetermined fixed angle and in the same direction as that of said micro reflecting segment and an inclined surface oriented at the same angle and in the same direction as that of said micro light transmitting segment of said strip-like micro half-transparent mirror segment opposed thereto, said inclined surfaces of said micro recesses having substantially the same widths as those of said micro reflecting segments and said micro light transmitting segments opposed thereto of said strip-like micro half-transparent mirror segments, respectively, the number of said micro recesses being substantially the same as that of said half-transparent mirror segments positioned at said central area of said display screen surface.

7. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments continuously disposed on the front surface of said half-transparent mirror vertically of said large-sized display screen and substantially in parallel to one another, each of said strip-like micro half-transparent mirror segments consisting of a strip-like micro reflecting segment which extends horizontally of said large-sized display screen and has a micro width vertically thereof and a strip-like micro light transmitting segment formed adjacent to said strip-like micro reflecting segment which also extends horizontally of said large-sized display screen and has a micro width vertically thereof, the front surface of said micro reflecting segment and the front surface of said micro light transmitting segment of each of said half-transparent mirror segments protruding forward and being inclined in opposite directions to each other in vertical sections thereof, the inclined front surface of each of said micro reflecting segments having a reflecting surface formed thereon for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

the inclined front surfaces of said micro reflecting segments of said half-transparent mirror segments at least positioned at said central area of said display screen surface which is within said angle of field of image capture of said image capturing means being oriented at a predetermined fixed angle and in the same direction, respectively; and said half-transparent mirror further comprising a multiplicity of strip-like micro recesses formed in a central region of the back of said half-transparent mirror in opposing relation to said central area of said display screen surface, said strip-like micro recesses being formed in opposing relation to said half-transparent mirror segments positioned at said central area of said display screen surface, respectively, each micro recess having an inclined surface oriented in the same direction as that of said micro reflecting segment and an inclined surface oriented in the same direction as that of said micro light transmitting segment of said strip-like micro half-transparent mirror segment opposed thereto, said micro recesses having substantially the same widths as those of said half-transparent mirror segments opposed thereto, respectively, the number of said micro recesses being substantially the same as that of said half-transparent mirror segments positioned at said central area of said display screen surface, angles of the inclined surfaces of said micro recesses opposed to said light transmitting segments being changed to become larger or smaller on a stepwise basis in vertical direction.

8. A display and image capture apparatus comprising:

display means having a large-sized display screen for displaying an image thereon;

a half-transparent mirror, disposed in front of and substantially parallel to said large-sized display screen substantially over the entire area thereof, for reflecting a portion of light from a subject located in front of said large-sized display screen and for transmitting therethrough a portion of light from said image on said display screen, said half-transparent mirror comprising a multiplicity of strip-like micro half-transparent mirror segments continuously disposed on the front surface of said half-transparent mirror vertically of said large-sized display screen and substantially in parallel to one another, each of said strip-like micro half-transparent mirror segments consisting of a strip-like micro reflecting segment which extends horizontally of said large-sized display screen and has a micro width vertically thereof and a strip-like micro light transmitting segment formed adjacent to said strip-like micro reflecting segment which also extends horizontally of said large-sized display screen and has a micro width vertically thereof, the front surface of said micro reflecting segment and the front surface of said micro light transmitting segment of each of said half-transparent mirror segments protruding forward and being inclined in opposite directions to each other in vertical sections thereof, the inclined front surface of each of said micro reflecting segments having a reflecting surface formed thereon for reflecting a portion of light from said subject;

at least one image capturing means disposed diagonally to said large-sized display screen so as to have at least a central area of the display screen surface within the angle of field of image capture of said image capturing means, said image capturing means receiving light reflected from said half-transparent mirror and capturing the image of said subject;

the inclined front surfaces of said micro reflecting segments of said half-transparent mirror segments at least positioned at said central area of said display screen which is within said angle of field of image capture of said image capturing means being oriented at a predetermined fixed angle and in the same direction, respectively; and said half-transparent mirror further comprising a multiplicity of strip-like micro ridges formed in a central region of the back of said half-transparent mirror in opposing relation to said central area of said display screen surface, said micro ridges being formed in opposing relation to said micro light transmitting segments of said half-transparent mirror segments positioned at said central area of said display screen surface and having inclined surfaces oriented in the same direction as that of said micro light transmitting segments opposed thereto, respectively, said micro ridges having substantially the same widths as those of said micro light transmitting segments opposed thereto, respectively, the number of said micro ridges being substantially the same as that of said half-transparent mirror segments positioned at said central area of said display screen surface, angles of the inclined surfaces of said micro ridges opposed to said micro light transmitting segments being changed to become larger or smaller on a stepwise basis in vertical direction.

9. The apparatus of any one of claims 1, 2, 3, 4, 5, 6, 7 and 8 wherein said display means is a projection type display including a projector, and said display screen displays an image projected thereto by said projector.

* * * * *